United States Patent
Manzardo (10) Patent No.: US 7,257,629 B2
(45) Date of Patent: Aug. 14, 2007

(54) METHOD AND APPARATUS FOR PROVIDING BACK-UP CAPABILITY IN A COMMUNICATION SYSTEM

(75) Inventor: Marcel B. Manzardo, Los Gatos, CA (US)

(73) Assignee: Siemens Communications, Inc., Boca Raton, FL (US)

( * ) Notice: Subject to any disclaimer, the term of this patent is extended or adjusted under 35 U.S.C. 154(b) by 474 days.

(21) Appl. No.: 09/965,180

(22) Filed: Sep. 27, 2001

(65) Prior Publication Data

US 2003/0061319 A1 Mar. 27, 2003

(51) Int. Cl.
*G06F 15/16* (2006.01)

(52) U.S. Cl. .................... 709/224; 709/227; 379/9.05; 379/15.01

(58) Field of Classification Search ................ 709/203, 709/217, 223–229; 714/4, 10, 13, 15; 379/1.03–1.04, 379/9.05, 12, 15.01, 15.05–16
See application file for complete search history.

(56) References Cited

U.S. PATENT DOCUMENTS

| | | | |
|---|---|---|---|
| 4,347,605 A | 8/1982 | Hashizume et al. | |
| 4,627,045 A | 12/1986 | Olson et al. | |
| 4,748,658 A | 5/1988 | Gopal et al. | |
| 5,661,779 A | 8/1997 | Lee | |
| 5,696,895 A | 12/1997 | Hemphill et al. | |
| 5,712,854 A | 1/1998 | Dieudonne et al. | |
| 5,812,751 A * | 9/1998 | Ekrot et al. ................... 714/4 |
| 5,951,694 A * | 9/1999 | Choquier et al. ........... 709/203 |
| 5,974,114 A * | 10/1999 | Blum et al. .................... 379/9 |
| 5,978,565 A * | 11/1999 | Ohran et al. .................. 714/13 |
| 6,005,920 A * | 12/1999 | Fuller et al. ............... 379/9.05 |
| 6,034,961 A | 3/2000 | Masuo et al. | |
| 6,058,424 A * | 5/2000 | Dixon et al. ................. 709/226 |
| 6,205,557 B1 * | 3/2001 | Chong et al. ................... 714/4 |
| 6,298,039 B1 * | 10/2001 | Buskens et al. ............. 370/216 |
| 6,330,602 B1 * | 12/2001 | Law et al. ................... 709/226 |
| 6,412,079 B1 * | 6/2002 | Edmonds et al. ............. 714/11 |
| 6,539,494 B1 * | 3/2003 | Abramson et al. ............. 714/4 |
| 6,567,813 B1 * | 5/2003 | Zhu et al. .................... 707/100 |
| 6,609,213 B1 * | 8/2003 | Nguyen et al. ............. 709/223 |
| 6,996,222 B2 * | 2/2006 | Chakera ................. 379/212.01 |
| 2002/0161893 A1* | 10/2002 | Wical ........................ 709/227 |
| 2003/0072430 A1* | 4/2003 | Berranger .............. 379/210.01 |

* cited by examiner

*Primary Examiner*—Moustafa M. Meky (57) ABSTRACT

Embodiments of the present invention provide a system, method, apparatus, means, and computer program code for facilitating or providing a back-up capability in a communication system and for improving availability and reliability of a distributed communication system. Switch over occurs from a main server to a stand-by server for supporting or facilitating calls having traffic routed across an IP network when the main server is disrupted or becomes unavailable. The main server initiates one or more signals provided to the stand-by server that inform the stand-by server of availability of the main server. When the stand-by server does not receive a designated number of the signals, or the main server fails to respond to a request or inquiry from the stand-by server regarding the signal, the stand-by server may initiate providing support for the calls previously supported by the main server and request call state information at the time of switch over from the main server to the stand-by server. As a result, the stand-by server does not need to receive call state information prior to the time of switch over.

15 Claims, 9 Drawing Sheets

METHOD AND APPARATUS FOR PROVIDING BACK-UP CAPABILITY IN A COMMUNICATION SYSTEM

FIELD OF THE INVENTION

The present invention relates to a method and apparatus for improving availability and reliability of a distributed communication system and, more particularly, embodiments of the present invention relate to methods, means, apparatus, and computer program code for providing a back-up capability in a communication system.

BACKGROUND OF THE INVENTION

In some communication systems, it is not unusual for a hardware or software problem to disrupt communication between two or more callers. Some telecommunication equipment may include redundant capabilities in order to improve reliability. For example, the equipment may duplicate critical components within a single system, such as processors and power supplies. While this technique may provide against failures of components, it does not protect against a complete equipment failure of the single system or lack of accessibility or availability of the single system. A fire, earthquake, external power failure, or other disruption may cause a failure of the single system or result in the single system being unavailable or inaccessible for a period of time. Such a disruption may halt calls in progress and prevent new calls from taking place.

In some scenarios, a redundant stand-by system at a geographically different location from a primary system may provide a higher degree of overall system availability and reliability. Unfortunately, maintaining call state databases, system configuration and other information continuously synchronized between the two systems requires a considerable amount of real-time data traffic between the two systems. In voice communication systems, the requirement for continuous data communication cannot be implemented in a realistic or real-time manner as the amount of data being generated and transferred between the two systems is too large. This problem is exacerbated when an IP (Internet Protocol) network is used as part of the communication system It would be advantageous to provide a method and apparatus that overcame the drawbacks of the prior art. In particular, it would be desirable to provide a method and apparatus that allowed a stand-by server to provide redundant capabilities for conducting calls and maintaining calls in progress without having to update call state databases continuously. In addition, it would be desirable to provide a method and apparatus that allowed such redundant capabilities for communication systems using one or more IP networks.

SUMMARY OF THE INVENTION

Embodiments of the present invention provide a system, method, apparatus, means, and computer program code for facilitating or providing a back-up capability in a communication system and, more particularly, embodiments of the present invention relate to methods, means, apparatus, and computer program code for improving availability and reliability of a distributed communication system.

The methods of the present invention facilitate switching from a main server to a stand-by server interconnected via an IP network when the main sever is disrupted or becomes unavailable, or a switch over is specifically requested despite availability of the main server. The main server may initiate signals that are directly or indirectly sent or provided to the stand-by server that inform the stand-by server of availability of the main server. The same signals also may be sent to, or received by, other devices connected to or in communication with the main server and the stand-by server. When the stand-by server does not receive a designated number of these signals, or the main server fails to respond to a request or inquiry from the stand-by server regarding the signal, the stand-by server may initiate providing support for the calls previously supported by the main server and create a call state database for all calls or lines being supported or potentially supported by the stand-by server. In some embodiments, the stand-by server may request call state information from other devices to help create or update the call state database. In some embodiments, the stand-by server may initiate a switchover sequence for providing support after failing to receive a pre-determined number of signals from the main server indicating availability of the main server.

In some implementations or embodiments, switch over from the main server to the stand-by server during one or more calls in progress may occur such that little, if any, data is lost for the call(s) or such that people or devices participating in the call(s) do not realize that the switch over has occurred between the main server and the stand-by server. In other implementations or embodiments, all current calls will be dropped when switch over occurs between the main server and the stand-by server and the stand-by server may not attempt to maintain calls in progress.

Additional advantages and novel features of the present invention shall be set forth in part in the description that follows, and in part will become apparent to those skilled in the art upon examination of the following or may be learned by the practice of the invention.

According to embodiments of the present invention, a method for allowing a stand-by server to take over support for communications from a main server may include detecting lack of a signal initiated by a main server, wherein reception of the signal is indicative of availability of the main server; establishing a connection with at least one client connection device (this can be a telephony device, distributed shelf, user device, or any data device); requesting current call state information from the client connection device; receiving current call state information from the client connection device; and updating call state information resource based on the current call state information received from the client connection device. In another embodiment, a method for allowing a client connection device to switch between a main server and a stand-by server may include conducting a call via a connection with a main server; dropping the connection to the main server; establishing a connection with a stand-by server to support the call; receiving a request for call state information from the stand-by server; providing current call state information to the stand-by server; and conducting the call via the connection with the stand-by server. In a further embodiment, a method for allowing a stand-by server to take over support for communications from a main server may include detecting lack of a signal sent or initiated by a main server, wherein reception of the signal is indicative of availability of the main server; establishing a connection with at least one client connection device; requesting that the client connection device reset an active call to a designated call state; and creating a call state information resource based, at least in part, on the designated call state. In yet another embodiment, a method for allowing a client connection device to switch between a main server and a stand-by server may include conducting a call via a connection with a main server; dropping the connection to the main server; establishing a connection with a stand-by server to support the call; receiving a request initiated by the stand-by server to reset the call to a designated call state; and resetting the call to the designated call state. In still another embodiment, a method for allowing a stand-by server to take over support for communications from a main server may include a main server establishing at least one connection with at least one client connection device for support of at least one call; the main server providing at least one signal to a standby server when the main server is available; the stand-by server establishing at least one connection with the at least one client connection device when the stand-by server does not receive a designated number of signals from the main server indicative of availability of the main server; the stand-by server requesting call state information from the at least one client connection device; and the stand-by server updating a call state information resource based on the call state information received from the at least one client connection device. In an even further embodiment, a method for allowing a stand-by server to take over support for communications from a main server may include a main server establishing at least one connection with at least one client connection device for support of at least one call; the main server providing at least one signal to a stand-by server when the main server is available; the stand-by server establishing at least one connection with the at least one client connection device when the stand-by server does not receive a designated number of signals from the main server indicative of availability of the main server; the stand-by server requesting at least one client connection device to reset to a designated call state; and the stand-by server creating a call state information resource based, at least in part, on the designated call state.

According to embodiments of the present invention, an apparatus may include means for performing some or all of each of the methods discussed above.

According to embodiments of the present invention, a system for facilitating communications may include a first server, wherein the first server can establish at least one connection with at least one client connection device for support of at least one call; and a second server in communication with the first server such that the first server provides at least one signal to the second server when the first server is available, wherein the second server establishes at least one connection with the at least one client connection device when the second server does not receive a designated number of one or more signals from the first server indicative of availability of the first server to support at least one call.

According to embodiments of the present invention, a computer program product in a computer readable medium for facilitating communications may include first instructions for directing a first server to establish at least one connection with at least one client connection device for support of at least one call; second instructions for directing the first server to initiate at least one signal sent to a second server when the first server is available, the signal being indicative of availability of the first server to support the at least one call; third instructions for directing the second server to establish at least one connection with the at least one client connection device when the second server does not receive a designated number of signals initiated by the first server indicative of availability of the first server; fourth instructions for directing the second server to request call state information from the at least one client connection device; and fifth instructions for directing the second server to update a call state information resource based on the call state information received from the at least one client connection device. In another embodiment, a computer program product in a computer readable medium for facilitating communications may include first instructions for directing a first server to establish at least one connection with at least one client connection device for support of at least one call; second instructions for directing the first server to initiate at least one signal sent to a second server when the first server is available, the signal being indicative of the first server being available to support the at least one call; third instructions for directing the second server to establish at least one connection with the at least one client connection device when the second server does not receive a designated number of signals initiated by the first server indicative of availability of the first server; fourth instructions for directing the second server to request the at least one client connection device to reset to a designated call state; and fifth instructions for directing the second server to create a call state information resource based, at least in part, on the designated call state. Other embodiments may include computer program products in a computer readable medium that include instructions for completing one or more of the methods discussed above.

With these and other advantages and features of the invention that will become hereinafter apparent, the nature of the invention may be more clearly understood by reference to the following detailed description of the invention, the appended claims and to the several drawings attached herein.

BRIEF DESCRIPTION OF THE DRAWINGS

The accompanying drawings, which are incorporated in and form a part of the specification, illustrate the preferred embodiments of the present invention, and together with the descriptions serve to explain the principles of the invention.

DETAILED DESCRIPTION

Applicants have recognized that there is a need for systems, means, computer code and methods for facilitating or providing a back-up capability in a communication system and for improving availability and reliability of a distributed communication system. These and other features will be discussed in further detail below, by describing a system, individual devices, and processes according to embodiments of the invention.

System Description

Figure 1:
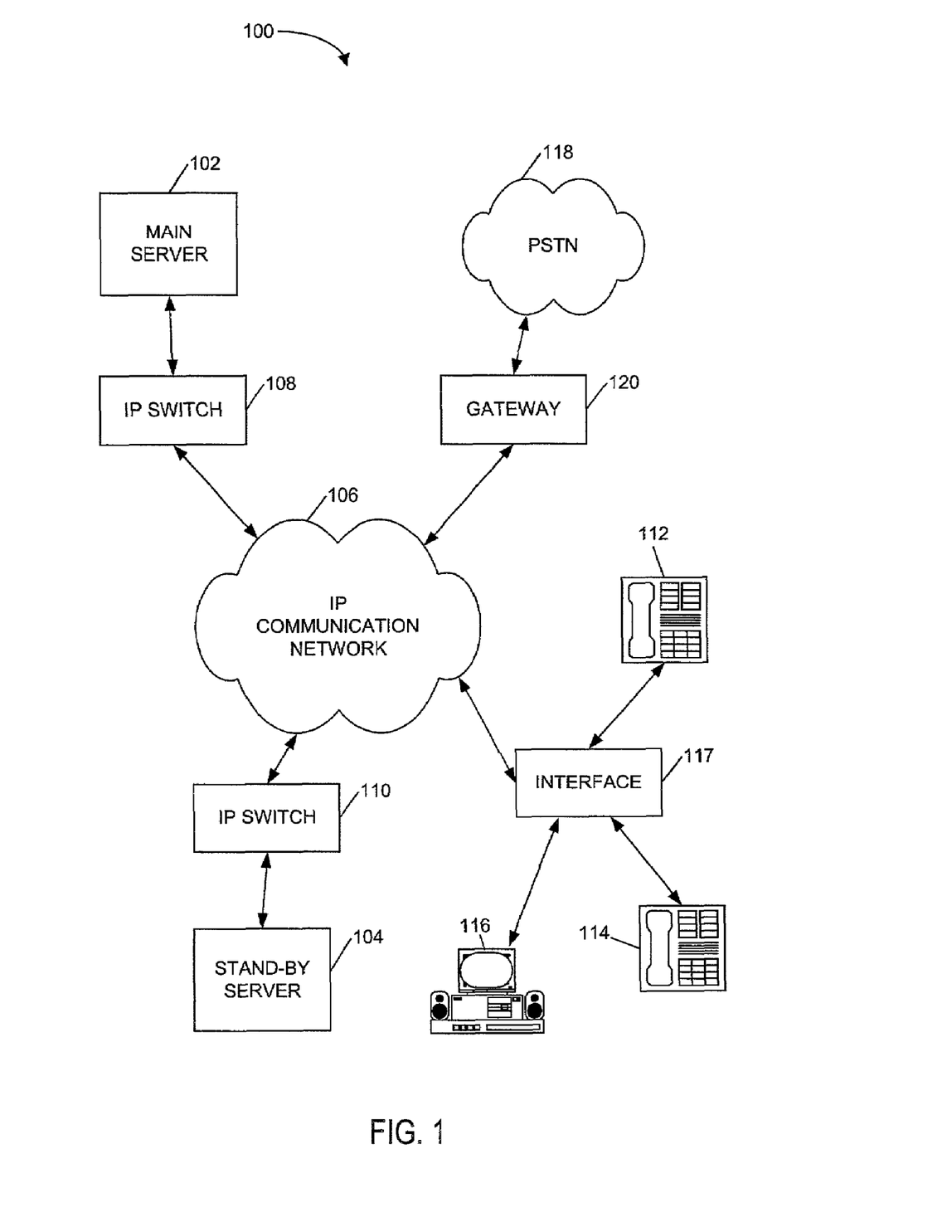
FIG. 1 is a general diagram of communications system in accordance with the present invention.

Reference is made to FIG. 1, where a system 100 is illustrated that facilitates redundancy between a main server 102 and a stand-by server 104. The main server 102 and the stand-by server 104 may be connected to or in communication with an IP (Internet Protocol) communication network 106 via IP switches 108, 110, respectively. The IP switches 108, 110 may function as hubs or routers.

The main server 102 and the stand-by server 104 may be in the same data center or location, or in different data centers or locations. In some embodiments, other devices, networks, etc. may be connected between the main server 102 and/or the stand-by server 104 and the IP network 106. In some embodiments, a main server and or a stand-by server may be or include a HiPath Communication Server manufactured by Siemens Corporation or other host computer, telecommunications controller or server, or device.

In some embodiments, the main server 102 may be connected into the same IP switch 108 as the stand-by server 104, which allows the servers to communicate without using the IP network. In some embodiments, the switch may be integrated into the main server 102. In some embodiments, an IP switch may be or include a Catalyst 2950 Series switch manufactured by Cisco Corporation or other similar device.

The main server 102 may facilitate communications between one or more telephones 112, 114 or other client devices 116 connected to the network 206 via an interface 117 and or one or more telephones, modems, or other client devices (e.g., facsimile machines, ATMs, cellular telephones, kiosks, personal digital assistants, two-way pagers, workstations, etc.) connected to or communicating via a PSTN (public switched telephone network) or other network 118 which connects to the network 106 via a gateway 120. Note that in some embodiments a gateway may be integrated into the interface 117 and/or into the main server 102 and/or into the stand-by server 104. More specifically, the main server 102 may facilitate or otherwise support voice, data and other connections or communications between telephones, modems and devices that travel at least in part over the IP network 106. For example, a person using the telephone 112 may conduct a voice communication to a person using a device (e.g., telephone, modem, facsimile machine) connected to the PSTN 118. The stand-by server 104 may act as a back-up to the main server 102 such that the stand-by server facilitates communications when the main server 102 is unavailable or unable to do so.

In some embodiments, the stand-by server 104 and/or the main server 102 may be connected to the PSTN 118 without going through the IP network 106. For example, in some embodiments, the main server 102 may include a gateway integrated into it that connects the main server 102 to the PSTN 118 or some other PSTN. Similarly, in some embodiments, the stand-by server 104 may include a gateway integrated into it that connects the stand-by server 104 to the PSTN 118 or some other PSTN. In other configurations, the main server 102 and/or the stand-by server 104 may be connected to a gateway or other client connection device that allows the main server 102 and/or the stand-by server 104 to communicate with the PSTN 118 without using the IP network 106.

In some embodiments, the main server 102 or some other device, personnel or software (e.g., network manager, IT personnel) may send or provide configuration information to the stand-by server 104. In addition, the main server 102 may receive, store and update configuration information from the same source that provides it to the stand-by server 104. Configuration information may be or include information regarding devices in the system 100, connections or routes between devices in the system 100, IP addresses for devices, call or line priority information, etc. New or updated configuration information may be provided whenever some or all of the system 100 changes, devices are added or removed from the system 100, etc.

The main server 102 and/or the stand-by server 104 may perform many functions, such as storing one or more databases, hosting a World Wide Web ("Web") site, processing transactions, etc., in addition to conducting, supporting or facilitating calls. The main server 102 and/or the stand-by server 104 each may comprise a single device or computer, a networked set or group of devices or computers, a workstation, a distributed set or group of devices, etc. In some embodiments, the main server 102 and/or the stand-by server 104 may include common control hardware or software that facilitates communications, call signaling and processing, switching processing, etc. between the servers and the network 106 or other devices. In some embodiments, a main or stand-by server also may function as a database server, Web hosting server, etc.

No specific implementations and hardware/software configurations are needed for the main server 102 or the stand-by server 104 and the methods disclosed herein are not limited to any specific hardware/software configuration.

The main server 102 and the stand-by server 104 may support IP telephony via or over the IP network 106. IP telephony uses Internet Protocol's packet switched connections to facilitate voice, facsimile, data and other forms of information transfer and delivery. Such information transfer and delivery also may include origination of a call from a device connected to a PSTN (such as the PSTN 118) or the IP network 106 (e.g., the telephone 112) and/or completion or initiation of a call to a device connected to a PSTN or the IP network 106. The main server 102 and the stand-by server 104 may have separate or distinct IP addresses associated with them. These IP addresses may be known or accessible by the gateway 120, interface 117 and other devices connected to or in the system 100 to facilitate switch over from the main sever 102 to the stand-by server 104. Similarly, the main server 102 and the stand-by server 104 may know or have access to the IP addresses of the gateway 120, interface 117 and other devices connected to or in the system 100 in order to make connections or send communications to such devices.

The IP network 106 may be or include the Internet, the Web, a local area network, a wide area network, or some other public or private computer, cable, telephone, client/server, peer-to-peer, or communications network or intranet based on the Internet protocol. The network 106 illustrated in FIG. 1 is meant only to be generally representative of cable, computer, telephone, peer-to-peer or other communication networks for purposes of elaboration and explanation of the present invention and other devices, networks, etc. may be connected to the communications network 106 without departing from the scope of the present invention. The communications network 106 or the system 100 also may include other public and/or private wide area networks, local area networks, wireless networks, data communication networks or connections, intranets, routers, satellite links, microwave links, cellular or telephone networks, radio links, fiber optic transmission lines, ISDN connections or lines, T1 lines, DSL, etc. Moreover, as used herein, calls and other communications include those enabled by wired or wireless technology.

Other devices (not shown) such as user or client devices, printers, routers, database servers, etc. may be connected to or part of the IP network. Possible user or client devices include a personal computer, portable computer, mobile or fixed user station, workstation, network terminal or server, cellular telephone, kiosk, dumb terminal, personal digital assistant, etc.

A gateway may be used to connect two different networks. For example, the gateway 120 connects the IP network 106 and the PSTN 118. A gateway may be or include a router, hub, switch or switching system, or other device. The PSTN 118 may include a router, switch or switching system that connects to or is in communication with the gateway 120. Gateways can be integrated in the servers 102/104 as well as interfaces 117.

An interface may be used to connect devices/clients to an IP network. In some embodiments, an interface may be or include an IP switch, distributed shelf, or other device. The term "interface", as used herein, is meant to be construed broadly and may be or include any device that facilitates connection of a telephone or other client device to an IP communication network. In some embodiments, an interface may be or include an AP 3300 IP Distributed Access Point manufactured by Siemens Corporation.

For purposes of description of the present invention and the claims that follow, "gateways" and "interfaces" both will be referred to as "client connection devices". A client connection device may monitor the call state or status or other communications conducted by telephones, facsimile machines, modems, etc. connected to the client connection device or communicating via the client connection device. For example, the interface 117 may monitor the call states of the telephones 112, 144 and client device 116. Call states for the telephone 112 may include the telephone 112 or the line to the telephone being active, idle, on hold, set for call forwarding, set for call transfer, etc. Thus, call state relates to the status of a device or the line to the device. The gateway 120 may know the call status for each line or trunk between the gateway 120 and the PSTN 118 (or a device in the PSTN 118). In some embodiments, a telephone or other client device may be connected to, or in communication with, an IP communication network without using or going through a separate interface, gateway or other client connection device. Thus, in such embodiments, such a telephone or client device may be considered as a client connection device.

Process Description

Figure 2:
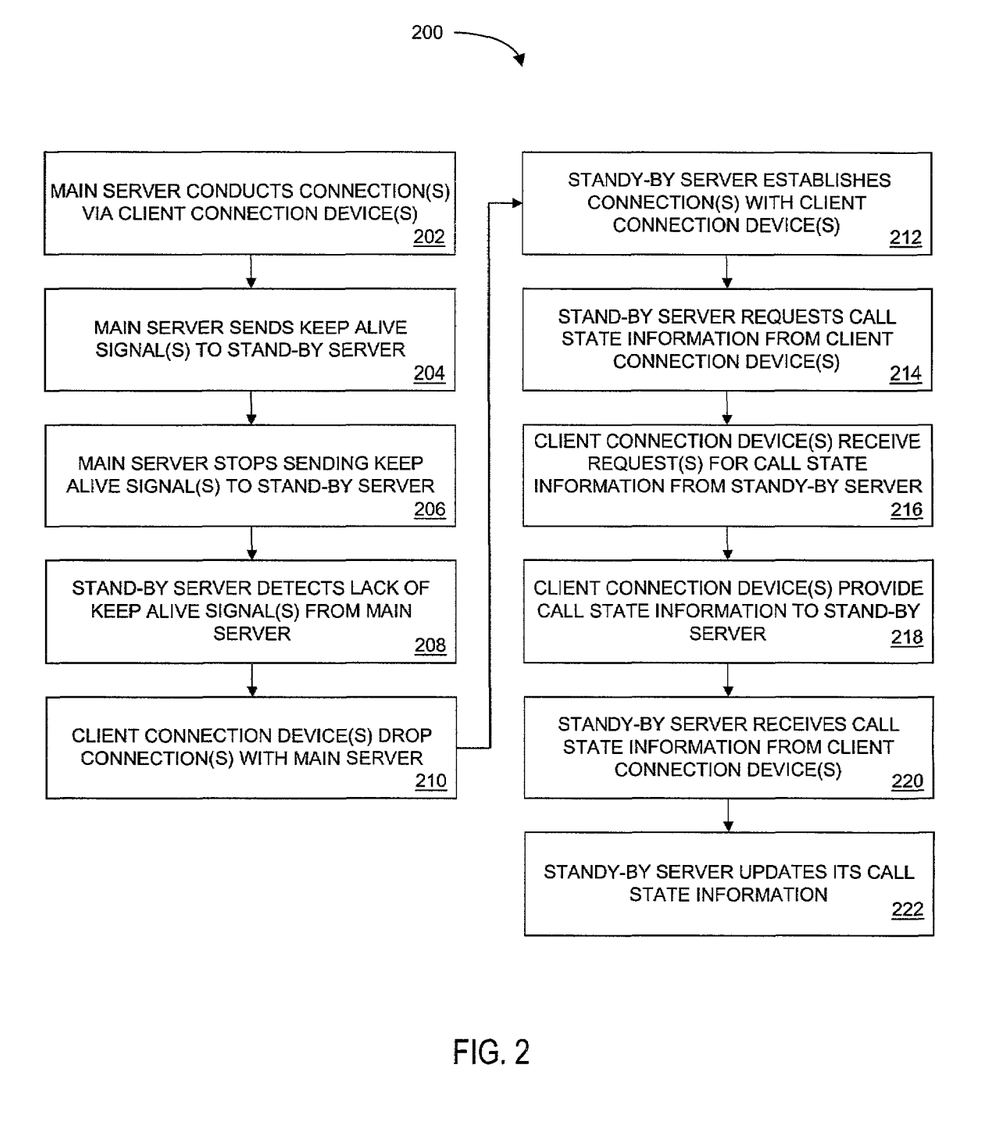
FIG. 2 is a flowchart of a first embodiment of a method usable with the system of FIG. 1 to provide a hot stand-by redundancy between the main server and the stand-by server of FIG. 1.

Reference is now made to FIG. 2, where a flow chart 200 is shown which represents the operation of a first embodiment of the present invention. The particular arrangement of elements in the flow chart 200 is not meant to imply a fixed order to the steps; embodiments of the present invention can be practiced in any order that is practicable.

The method 200 provides for switching from the main server 102 to the standby server 104 for calls having traffic routed across the IP network 106 when the main sever 102 is disrupted, becomes unavailable, or is other unable to support or facilitate the calls. For example, operation of the main server 102 may become disrupted due to a fire or power outage in the building containing the main server 102. The method 200 and the other methods disclosed herein particularly are useful when a TDM (Time Division Multiplexed) communications system is distributed over an IP network. In some implementations or embodiments, switch over from the main server 102 to the stand-by server 104 may occur such that little, if any, data is lost for the call or such that people or devices participating in the call do not realize that the switch over has occurred between the main server 102 and the stand-by server 104 and calls in progress can be maintained even in case of a partial or complete failure of the main server 102. Thus, the method 200 may allow or provide for "hot-standby" redundancy between the main server 102 and the stand-by server 104.

Processing begins at a step 202 during which the main server 102 facilitates or otherwise conducts connections for one or more calls via the gateway 120 and/or the interface 117 and/or some other client connection device(s). In some embodiments, a single call may include control information for the call and data (e.g., voice, facsimile data) transferred as part of the call.

The gateway 120 and/or the interface 117 or some other client connection device may establish one or more connections with the main server 102 when supporting one or more call(s) that will have data that travels over the IP communications network 106. The main server 102 may know or have the IP addresses associated with the gateway 120 and/or the interface 117 in order to send data, messages or other communications to the gateway 120 and/or the interface 117. Similarly, the gateway 120 and/or the interface 117 or other client connection device may know or have the IP addresses associated with the main server 102 in order to send data, messages or other communications to the main server 102. The main server 102 may establish and later drop connections with the gateway 120 and/or the interface 117 as calls are initiated and then ended at a later time.

During a step 204, the main server 102 provides or at least initiates at least one signal that is provided or sent directly or indirectly to the stand-by server 104, referred to herein as a "keep alive" signal, that indicates that the main server 102 is operational, available, or otherwise providing support for calls. The keep alive signal may be generated by a common control or other hardware or software associated with or in the main server 102. The gateway 120 and/or the interface 117 also may receive the keep alive signal or a similar signal and, in some embodiments, the main server 102 may send or initiate a keep alive signal specifically for the gateway 120 and/or interface 117 and/or some other client connection device. The method 200 may include a step during which the stand-by server 104 receives or otherwise detects one or more keep alive signals initiated by the main server 102. Similarly, in some embodiments, the method 200 may include a step during which a client connection device server receives or otherwise detects one or more keep alive signals initiated by the main server 102 and/or a step during which the main server 102 initiates or sends a keep alive signal to the gateway 120 and/or the interface 117. In addition, the stand-by server 104 and/or the main server 102 may receive, store and update configuration information on a regular basis, when needed, or on an ad hoc or random basis.

The keep alive signal initiated by the main server 102 may be transmitted directly or indirectly from the main server 102 to the stand-by server 104. Thus, the main server 102 may send the keep alive signal to one or more intermediary devices that forward or transmit some or all of the keep alive signal to the stand-by server 104. The intermediary device also may send or transmit some or all of the keep alive signal to one or more client connection devices. In some embodiments, the stand-by server 104 may receive a different signal than the signal initiated by the main server 102 as the keep alive signal. However, both signals shall be referred to as the keep alive signal regardless of any differences between them and the route the signal took between the main server 102 and the stand-by server 104.

In some embodiments, the main server 102 may provide the keep alive signal periodically, at designated times, at random intervals, or upon occurrence of certain events. So long as the stand-by server 104 receives at least one keep alive signal initiated by the main server 102, the stand-by server 104 does not provide support for the calls currently being handled or facilitated by the main server 102. However, in some embodiments, the stand-by server 104 may be performing other functions or activities (e.g., providing or facilitating support for other calls, running order processing software).

A keep alive signal may be in a variety of forms or formats. In some embodiments, a keep alive signal may include information such as, for example, a code or other identifier of the main server 102; a code or other identifier of the standby server 104; data indicative of a time and/or date the keep alive signal is initiated by the main server 102; data indicative of calls supported by the main server 102 when the main server 102 initiates the keep alive signal; data indicate of a status of a call supported by the main server 102; information regarding operational status, capacity or other characteristic of the main server 102; etc.

In some embodiments, the main server 102 may initiate or provide a keep alive signal at certain intervals or certain times. Thus, the stand-by server 104 may not initiate switch over from the main server 102 or support for calls handled by the main server 102 unless the stand-by server 104 fails to receive one or more of the keep alive signals or detects that one or more of the keep alive signals have not been received. For example, the stand-by server 104 may need to detect a lack of three keep alive signals before initiating switch over from the main server 102. In some embodiments, the stand-by server 104 may, upon detecting a lack of a keep alive signal from the main server 102, query the main server 102, request that the main server 102 provide information regarding its status, availability, etc., send a signal to the main server 102 indicative of the stand-by server's 104 lack of receipt of a keep alive signal at an expected time or interval, etc.

During a step 206, the main server 102 stops initiating or sending keep alive signals. Such cessation may be the result of the main server 102 going offline, losing power, losing connection to the IP switch 108 or the IP network 106, or some other malfunction, calamity, or communication problem.

During a step 208, the stand-by server 104 detects a lack or loss of one or more keep alive signals initiated by the main server 102. As previously mentioned above, in some embodiments the stand-by server 104 may need to detect a lack or more than one keep alive signal before proceeding with the method 200. In some embodiments, the method 100 may include a step during which the gateway 120 and/or the interface 117, or some other client connection device, detects a lack of a keep alive signal sent or initiated by the main server 102.

During a step 210, the gateway 120 and/or the interface 117 drop their connection(s) with the main server 102. Presumably, whatever problem happened with the main server 102 to stop it from sending keep alive signals to the stand-by server 104 will also result in a loss of the keep alive signal, if any, or other control, data or other signals being sent from the main server 102 to the gateway 120 and/or the interface 117. In some embodiments, the step 210 may occur as a result of the gateway 120, the interface 117, or some other client connection device detecting a designated missing number or lack of one or more keep alive signals sent or initiated by the main server 102.

During a step 212, the stand-by server 104 establishes connections with the gateway 120 and/or the interface 117. In some embodiments the step 212 may occur prior to the step 210 or as part of the step 210. In some embodiments, the step 210 may occur after the step 212 and as a result of the step 212.

As previously discussed above, the stand-by server 104 preferably knows or has access to, can retrieve, can request, or can otherwise obtain the IP addresses for the gateway 120 and/or the interface 117 and/or some other client connection device. Thus, the stand-by server 104 may initiate connections with the gateway 120 and/or the interface 117 by using the IP addresses. The stand-by server 104 may initiate such connections in the same manner that the main server 102 does when establishing connections the gateway 120 or interface 117. Since the gateway 120 and/or the interface 117 preferably know or have access to, can retrieve, can request, or can otherwise obtain the IP address(es) associated with the stand-by server 104, gateway 120 and/or the interface 117 can accept connections coming from or initiated by the stand-by server 104 as a trusted device. That is, since the gateway 120 and/or the interface 117 knows the IP address(es) associated with the stand-by server 104, and presumably communications from the stand-by server 104 will identify the stand-by server 104 or include one or more of its associated IP addresses, the gateway 120 and/or the interface 117 know when they receive communications from the stand-by server 104.

During a step 214, the stand-by server 104 requests call state (also referred to as "call status") information from the gateway 120 and/or the interface 117 and/or some other client connection device. The stand-by server 104 may request call state information for all lines or calls supported by the gateway 120 and/or the interface 117 or just some of the calls.

This request from the stand-by server during the step 214 is received by the gateway 120 and/or the interface 117 and/or some other client connection device during the step 216. The request sent by the stand-by server 104 during the step 214 may include more than one message or communication sent at the same or different times to the gateway 120 and/or the interface 117. Different messages or communications may request call state information for different lines or calls. In some embodiments, requests for call state information from different devices or for different lines, trunks, etc. may be prioritized and sent out in order of priority.

The stand-by server 104 needs the call state information so that it knows that state of lines or trunks connected to the gateway 120 or interface 117, or calls occurring via these lines or trunks, and can provide support for such the calls or gateway 120 and/or interface 117 accordingly.

While a connection between stand-by server 104 and the gateway 120 exists, the gateway 120 will provide such call state information to the stand-by server 104. However, the stand-by server 104 needs to receive the current call status information to support calls in progress and the other lines supported by the gateway 120 when the connection between the stand-by server 104 and the gateway 120 is established. A similar situation exists with the interface 117.

During a step 218, the gateway 120 and/or the interface 117 and/or some other client connection device provide the appropriate call status information, which is received by the stand-by server 104 during a step 220. The stand-by server 104 may receive call status information from different client connection devices at different times and/or via different routes. The step 220 may occur over a period of time. Call state information from a single client connection device may be sent in a single communication or be spread out over multiple communications.

During a step 222, the stand-by server 106 creates or updates a call state or call status database, log, file, or other call state resource with the information received during the step 220. The step 222 may begin prior to completion of the step 220 or even prior to the completion of the step 214. In some embodiments, the call state information may be kept with, or in the same database as, configuration information.

During or upon completion of the step 222, the stand-by server 104 may assume responsibility for some or all of the calls previously facilitated by the main server 102. In some embodiments, at this point, the stand-by server 104 may become the defacto main server while the main service may then function as the defacto stand-by server. The calls in progress conducted by the gateway 120 and/or the interface 117 as switch over from the main server 102 to the stand-by server 104 occurs preferably are not dropped, although some or all of them might be in some cases. Thus, callers or devices participating in the calls may not realize that management, control or support for the calls has been switched from the main server 102 to the stand-by server 104.

In other embodiments, the main server 102 may resume support of facilitation of some or all of the calls supported by the stand-by server 104 as soon as the main server 102 becomes operational again. Alternatively, after switch over from the main server 102 to the stand-by server 104, the main server 102 may then act as the "stand-by" server and the stand-by server 104 as the "main server". In either scenario, the main server 102 and the stand-by server may act as peers of each other or in a master/slave relationship (albeit with changing roles).

Figure 3:
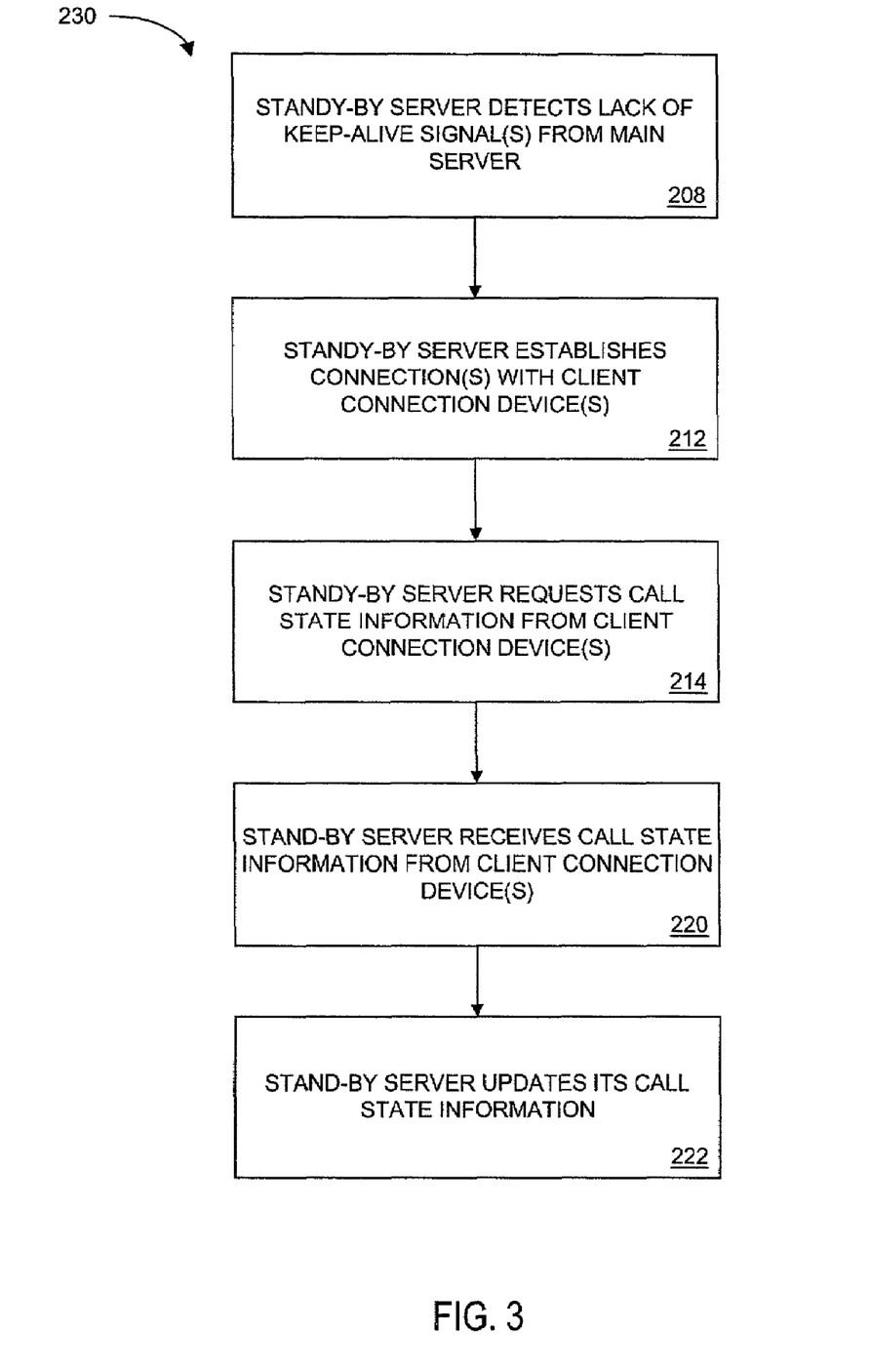
FIG. 3 is a flowchart of a second embodiment of a method in accordance usable with the system of FIG. 1, the method being directed to the point-of-view of the stand-by server of FIG. 1.

Reference is now made to FIG. 3, where a flow chart 230 is shown which represents the operation of a second embodiment of the present invention. The particular arrangement of elements in the flow chart 230 is not meant to imply a fixed order to the steps; embodiments of the present invention can be practiced in any order that is practicable. The method 230 is illustrated from the perspective of the stand-by server 104 and includes some, but not all, of the steps of the method 200. Thus, an entity operating the stand-by server 104 may operate as a separately from an entity operating the main server 102, as may happen in a disaster recovery operation where backup and redundancy capabilities are provided by one company on behalf of one or more other companies, data centers, etc. The method 230 includes the steps 208, 212, 214, 220 and 222 previously discussed above. In addition, the stand-by server 104 and/or the main server 102 and/or other devices may receive new or updated configuration as previously discussed above.

Figure 4:
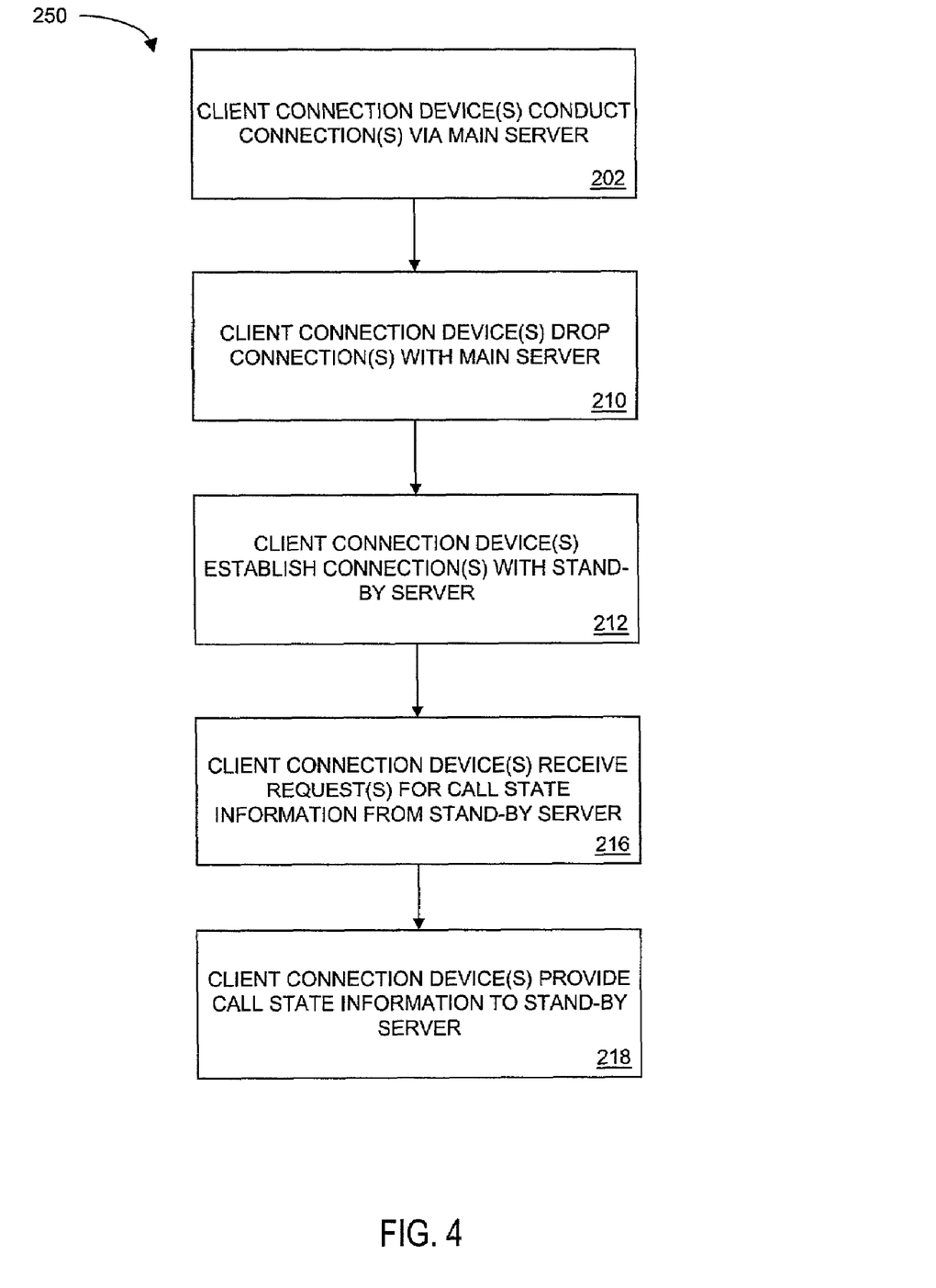
FIG. 4 is a flowchart of a third embodiment of a method in accordance with the present invention, the method being directed to the point-of-view of the gateway/interface of FIG. 1.

Reference is now made to FIG. 4, where a flow chart 250 is shown which represents the operation of a third embodiment of the present invention. The particular arrangement of elements in the flow chart 250 is not meant to imply a fixed order to the steps; embodiments of the present invention can be practiced in any order that is practicable. The method 250 is illustrated from the perspective of the gateway 120 and/or the interface 117 and includes some, but not all, of the steps of the method 200. The method 250 includes the steps 202, 210, 212, 226 and 218 previously discussed above. In addition, the stand-by server 104 and/or the main server 102 and/or other devices may receive new or updated configuration as previously discussed above.

Figure 5:
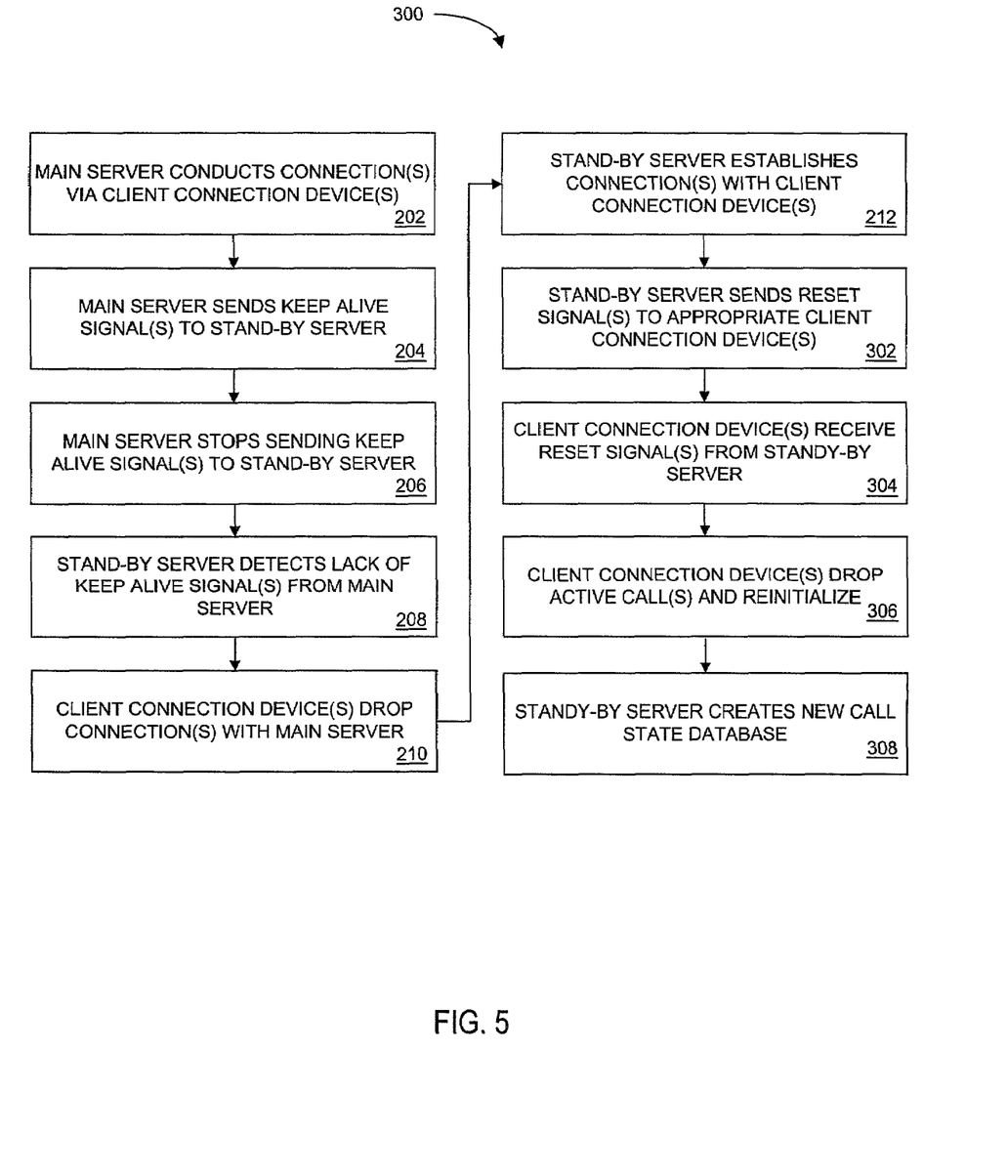
FIG. 5 is a flowchart of a fourth embodiment of a method usable with the system of FIG. 1 to provide a cold stand-by redundancy between the main server and the stand-by server of FIG. 1.

Reference is now made to FIG. 5, where a flow chart 300 is shown which represents the operation of a fourth embodiment of the present invention. The particular arrangement of elements in the flow chart 300 is not meant to imply a fixed order to the steps; embodiments of the present invention can be practiced in any order that is practicable.

The method 300 provides for switching from the main server 102 the stand-by server 104 for calls having traffic routed across the IP network 106 when the main sever 102 is disrupted, becomes unavailable, or is other unable to support the calls. Unlike the methods 200, 230, 250, which allow or may provide for "hot" standby support by the stand-by server 104 for the main server 102, the method 300 drops calls currently in progress when the switch is made from the main server 102 to the stand-by server 104. Thus, the method 300 provides "cold" stand-by or redundancy support for calls, as will be discussed in more detail below.

The method 300 includes the steps 202, 204, 206, 208, 210 and 212 previously described above. In addition, the method 300 includes a step 302 during which the stand-by server 104 sends one or more reset signals to the gateway 120 and/or the interface 117 and/or to one or more additional devices. The stand-by server 104 may send more than one reset signal at the same or at different times and may prioritize the order or destination of some or all of the signals. In addition, the stand-by server 104 and/or the main server 102 may receive new or updated configuration as previously discussed above.

The signal send by the stand-by server 104 during the step 302 may request that the gateway 120 and/or interface drop all active calls, reinitialize themselves, or conduct some other activity or function. Upon receiving such a reset signal during a step 304, such dropping, re-initialization, etc. may require implementation or activity by the gateway 120 and/or the interface 117 or may occur automatically during a step 306. The term "reset", as used herein, should not be construed any specific form, format or timing of the signal sent during the step 302 and is used herein for purposes of explanation, but not limitation.

Since the stand-by server 104 does not request current call status information from the gateway 120 and/or the interface 117, they do not provide such information to the stand-by server 104 and proceed to drop their calls and reinitialize. In some embodiments, the request(s) or signal(s) sent by the stand-by server 104 during the step 302 may request that the gateway 120 and/or the interface 117 reset or reinitialize themselves to a specific call state (e.g., idle). During a step 308, the stand-by server 104 can create or initialize a call status database, log or other resource based on the call states it expects or requires the gateway 120 and/or the interface 117 to initialize to based on its request. In other embodiments, the gateway 120 and/or the interface 117 may be programmed or set to reset or reinitialize to a designated call state that will be provided to or is known to the standby server 104. Thus, the stand-by server 104 can set up a call status database or resource accordingly. As the gateway 120 and interface 117 establish connections with the stand-by server 104 after the step 306, the stand-up server 104 can update its call status database or resource accordingly.

Figure 6:
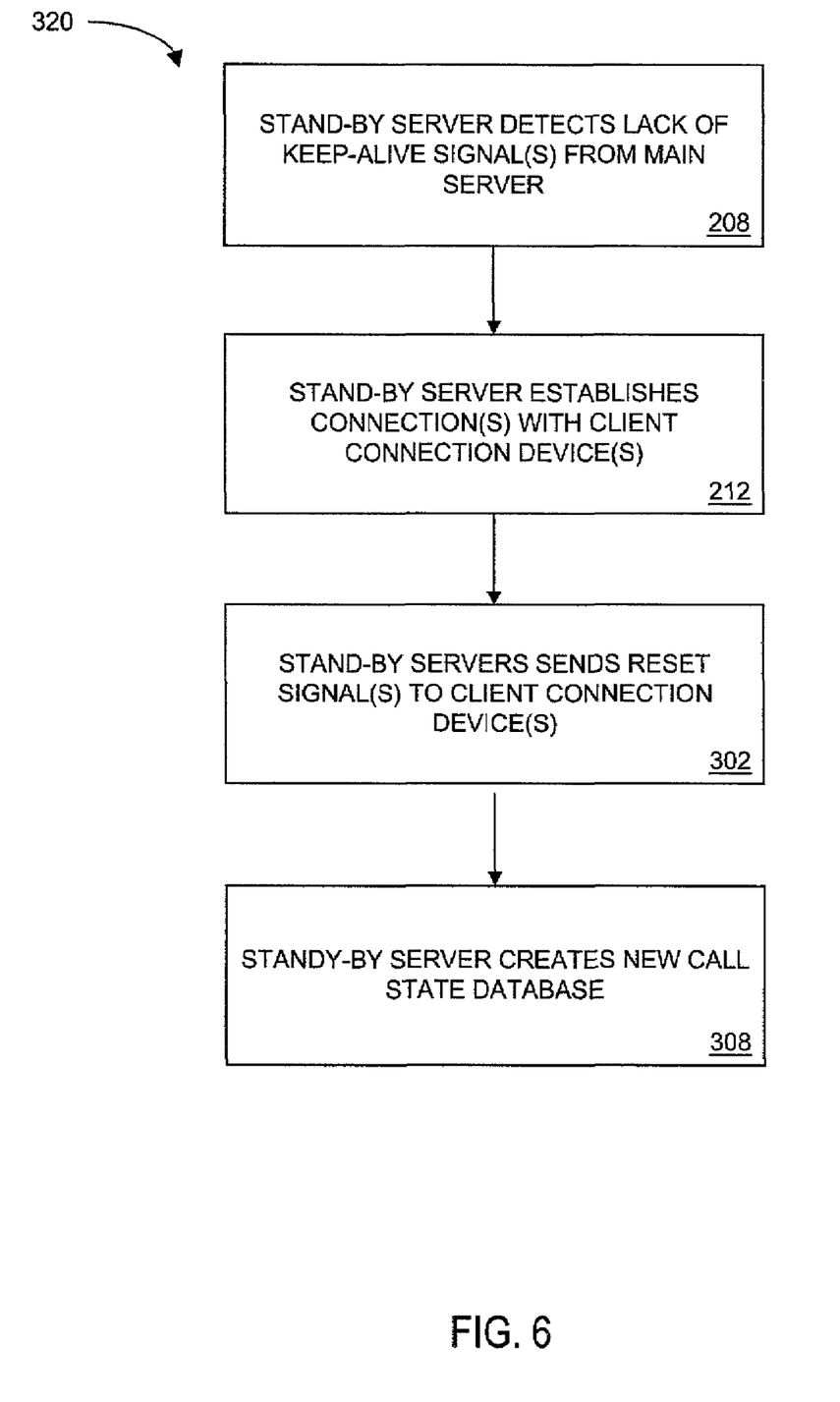
FIG. 6 is a flowchart of a fifth embodiment of a method in accordance usable with the system of FIG. 1, the method being directed to the point-of-view of the stand-by server of FIG. 1.

Reference is now made to FIG. 6, where a flow chart 320 is shown which represents the operation of a fifth embodiment of the present invention. The particular arrangement of elements in the flow chart 300 is not meant to imply a fixed order to the steps; embodiments of the present invention can be practiced in any order that is practicable. The method 300 is illustrated from the perspective of the stand-by server 104 and includes some, but not all, of the steps of the method 300. The method 300 includes the steps 208, 212, 302 and 308 previously discussed above. The stand-by server 104 and/or the main server 102 and/or other devices also may receive, store and update configuration information as previously discussed above.

Figure 7:
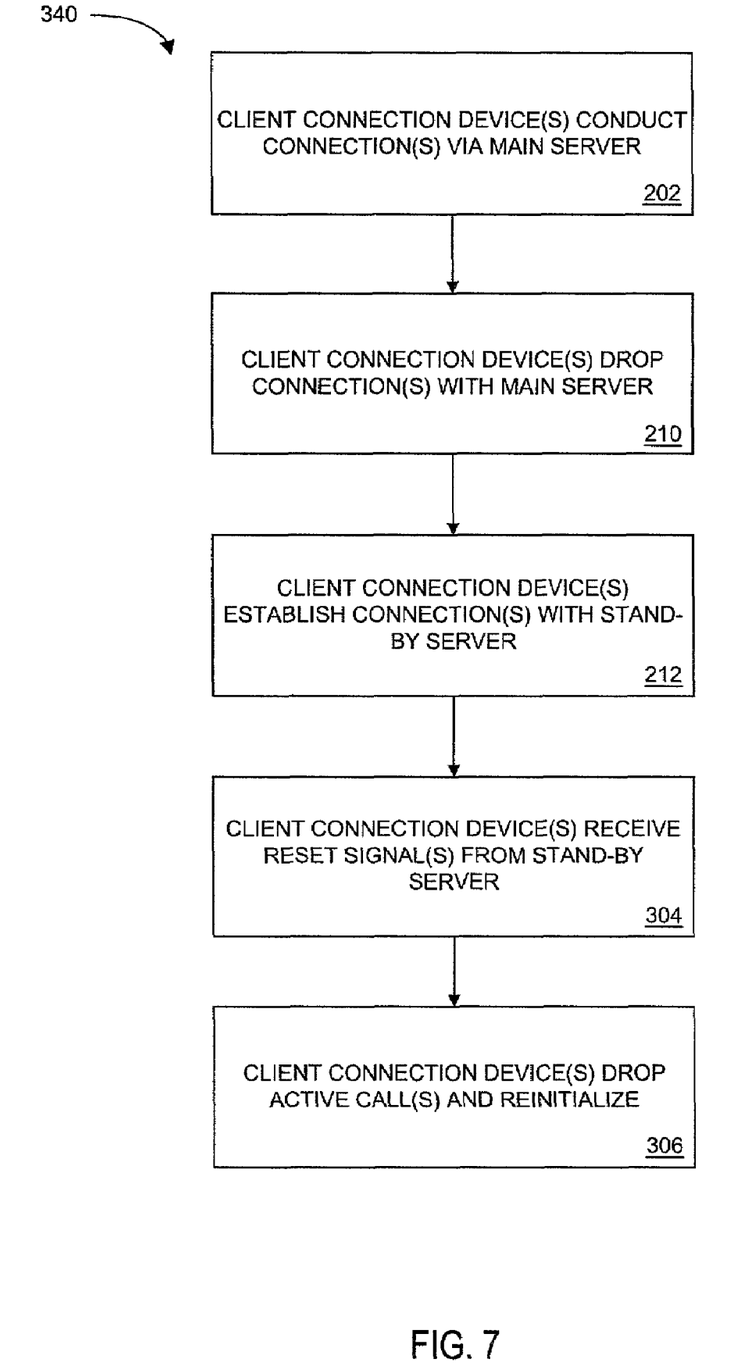
FIG. 7 is a flowchart of a sixth embodiment of a method in accordance with the present invention, the method being directed to the point-of-view of the gateway/interface of FIG. 1.

Reference is now made to FIG. 7, where a flow chart 340 is shown which represents the operation of a third embodiment of the present invention. The particular arrangement of elements in the flow chart 340 is not meant to imply a fixed order to the steps; embodiments of the present invention can be practiced in any order that is practicable. The method 340 is illustrated from the perspective of the gateway 120 and/or the interface 117 and includes some, but not all, of the steps of the method 300. The method 250 includes the steps 202, 210, 212, 304 and 306 previously discussed above. The stand-by server 104 and/or the main server 102 and/or other devices also may receive, store and update configuration information as previously discussed above.

In all of the methods disclosed above, the stand-by server 104, main server 102, gateway 120, interface 117 and/or other devices may receive a signal that initiates switch over from the main server 102 to the stand-by server 102. Activity after receipt of the switch over signal can be the same as the stand-by server 104 missing one or more keep alive signals from the main server 102 or otherwise detecting a lack of a keep alive signal initiated by the main server 102.

All requests, messages or other communications sent between the devices of the system 100 may be electronic communications in various forms and formats and no specific form or format for such electronic communications is required for the methods disclosed herein.

Server

Figure 8:
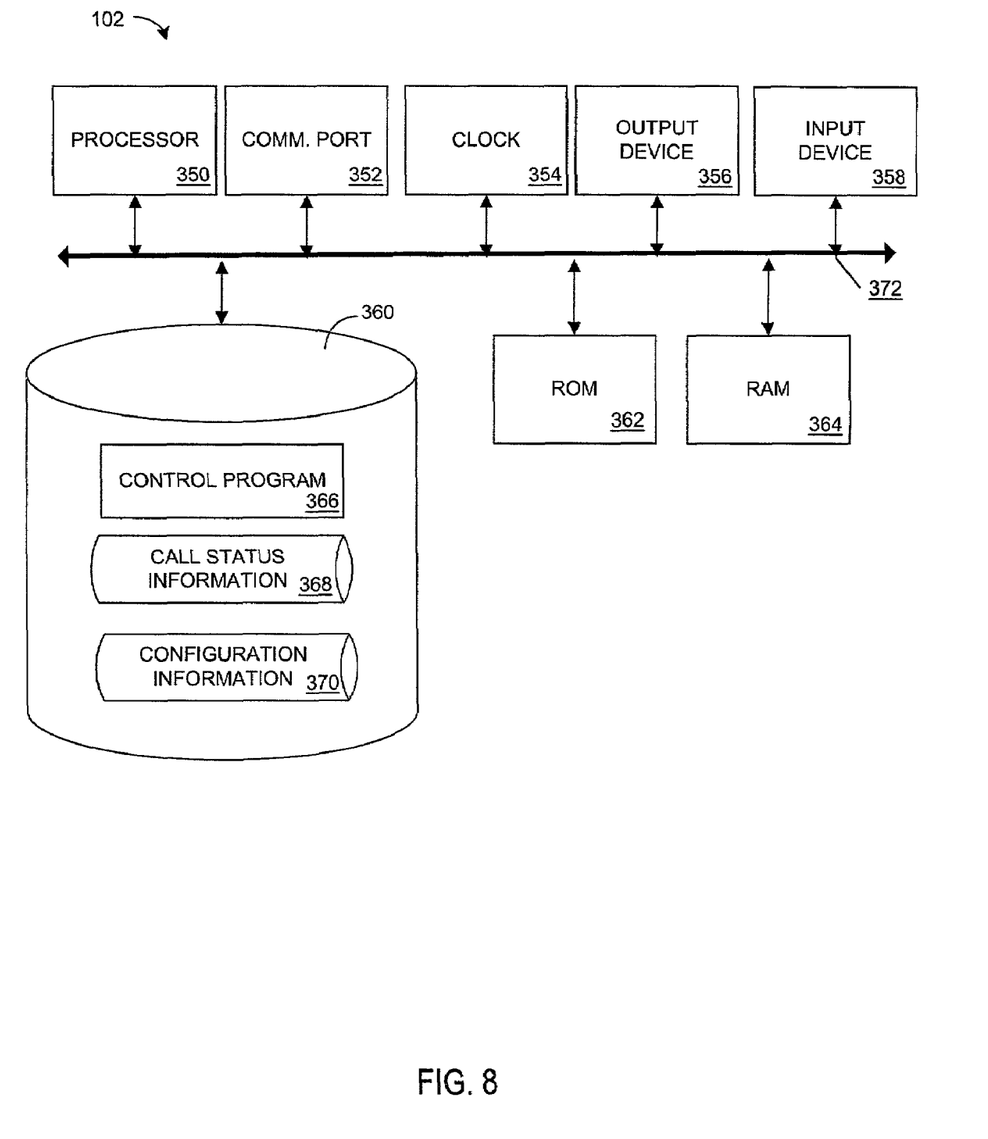
FIG. 8 is a block diagram of a representative main server or stand-by server of FIG. 1.

Now referring to FIG. 8, a representative block diagram of a main server 102 illustrated. In some embodiments, the stand-by server 104 may include some or all of the same components, software, etc.

The main server 102 may include a processor, microchip, central processing unit, or computer 350 that is in communication with or otherwise uses or includes one or more communication ports 352 for communicating with or connecting to the IP network 106, the IP switch 108, user devices and/or other devices. Communication ports may include such things as local area network adapters, common controls, wireless communication devices, Bluetooth technology, IP addressable interfaces, switches, line adapters or interfaces, etc. The main server 102 also may include an internal clock element 354 to maintain an accurate time and date for the main server 102, create time stamps for communications received or sent by the main server 102, etc.

In some embodiments, the main server 102 may include one or more output devices 356 such as a printer, infrared or other transmitter, antenna, audio speaker, display screen or monitor, text to speech converter, etc., as well as one or more input devices 358 such as a bar code reader or other optical scanner, infrared or other receiver, antenna, magnetic stripe reader, image scanner, roller ball, touch pad, joystick, touch screen, microphone, computer keyboard, computer mouse, etc.

In addition to the above, the main server 102 may include a memory or data storage device 360 to store information, software, databases, communications, device drivers, call statuses, configuration details, etc. The memory or data storage device 360 preferably comprises an appropriate combination of magnetic, optical and/or semiconductor memory, and may include, for example, Random Read-Only Memory (ROM), Random Access Memory (RAM), a tape drive, flash memory, a floppy disk drive, a Zip™ disk drive, a compact disc and/or a hard disk. The main server 102 also may include separate ROM 362 and RAM 364.

The processor 350 and the data storage device 360 in the main server 102 each may be, for example: (i) located entirely within a single computer or other computing device; or (ii) connected to each other by a remote communication medium, such as a serial port cable, telephone line or radio frequency transceiver. In one embodiment, the main server 102 may comprise one or more computers that are connected to a remote server computer for maintaining databases.

A conventional personal computer or workstation with sufficient memory and processing capability may be used as the main server 102. In one embodiment, the main server 102 operates as or includes a Web server for an Internet environment. The main server 102 preferably is capable of high volume transaction processing, performing a significant number of mathematical calculations in processing communications and database searches. A Pentium™ microprocessor such as the Pentium III™ microprocessor, manufactured by Intel Corporation may be used for the processor 350. Equivalent processors are available from Motorola, Inc., AMD, or Sun Microsystems, Inc. The processor 350 also may comprise one or more microprocessors, computers, computer systems, etc.

Software may be resident and operating or operational on the main server 102. The software may be stored on the data storage device 360 and may include a control program 366 for operating the server, databases, facilitating communications, establishing connections with the gateway 120 and/or the interface 117, providing or initiating keep alive signals, etc. The control program 366 may control the processor 350. The processor 350 preferably performs instructions of the control program 366, and thereby operates in accordance with the present invention, and particularly in accordance with the methods described in detail herein. The control program 366 may be stored in a compressed, uncompiled and/or encrypted format. The control program 366 furthermore includes program elements that may be necessary, such as an operating system, a database management system and device drivers for allowing the processor 350 to interface with peripheral devices, databases, etc. Appropriate program elements are known to those skilled in the art, and need not be described in detail herein.

The main server 102 also may include or store information regarding connections, gateways, interfaces, other client connection devices, calls, addresses, user devices, configuration details, content, requests, connections, communications, etc. For example, information regarding call status for one or more calls or lines may be stored in a call status or call state information database 368 for use by the main server 102 or another device or entity. Similarly, configuration information may be stored in a configuration information database 370 for use by the main server 102 or another device or entity. In some embodiments, some or all of one or more of the call status information database 368 of the configuration information database 370 may be stored or mirrored locally and/or remotely from the main server 102.

According to an embodiment of the present invention, the instructions of the control program may be read into a main memory from another computer-readable medium, such as from the ROM 362 to the RAM 364. Execution of sequences of the instructions in the control program causes the processor 350 to perform the process steps described herein. In alternative embodiments, hard-wired circuitry may be used in place of, or in combination with, software instructions for implementation of some or all of the methods of the present invention. Thus, embodiments of the present invention are not limited to any specific combination of hardware and software.

The processor 350, communication port 352, clock 354, output device 356, input device 358, data storage device 360, ROM 362, and RAM 364 may communicate or be connected directly or indirectly in a variety of ways. For example, the processor 350, communication port 352, clock 354, output device 356, input device 358, data storage device 360, ROM 362, and 3AM 264 may be connected via a bus 372.

While specific implementations and hardware configurations for the main server 102 has been illustrated, it should be noted that other implementations and hardware/software configurations are possible and that no specific implementation or hardware/software configuration is needed. Thus, not all of the components illustrated in FIG. 8 may be needed for a server implementing the methods disclosed herein. In addition, many different types of implementations, topologies or hardware/software configurations can be used in the system 100 and the methods disclosed herein are not limited to any specific implementation, topology or hardware/software configuration.

Figure 9:
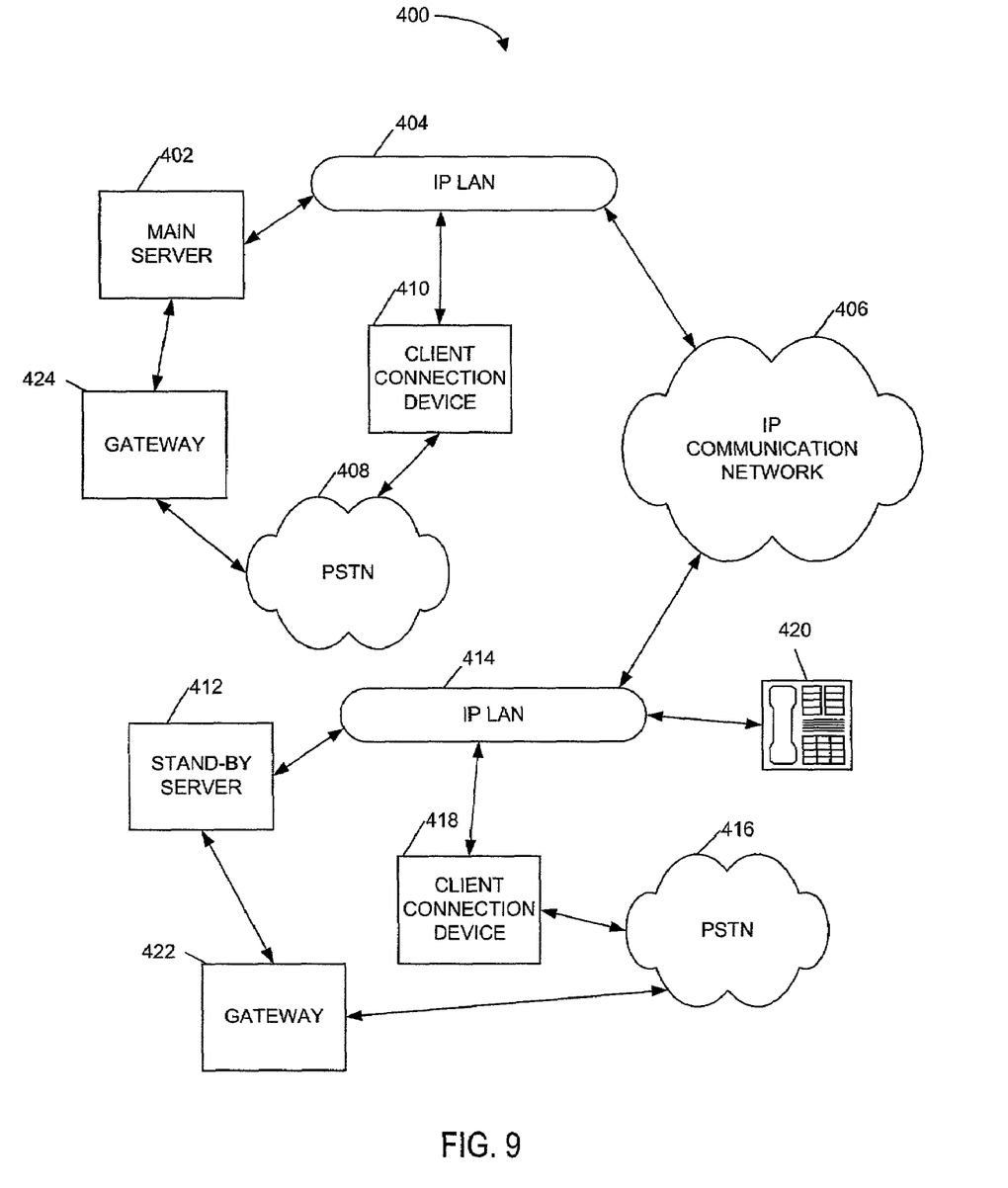
FIG. 9 is a general diagram of a second communications system usable with the methods of FIGS. 2–7.

Now referring to FIG. 9, a second communications system 400 usable with the methods of FIGS. 2–7 discussed above is illustrated. The system 400 includes a main server 402 connected via an IP LAN (local area network) to an IP communication network 406 and to a PSTN 408 via a gateway 410. In addition, the system 400 includes a stand-by server 402 connected via an IP LAN 414 to the IP network 406 and to a PSTN 416 via a gateway 418. An intelligent telephone 420 also is connected to the IP LAN 414. In some embodiments, the main server 402 may include a gateway integrated into it that connects the main server 102 to the PSTN 408, the PSTN 416, or some other PSTN. Similarly, in some embodiments, the stand-by server 412 may include a gateway integrated into it that connects the stand-by server 412 to the PSTN 408, the PSTN 416, or some other PSTN.

The main server 402 and the stand-by server 412 provide support for or otherwise facilitate calls having traffic passing over, through or within the IP network 406, IP LAN 404/414 or the PSTN 408/416. The calls may originate from the client device 420 (which also may be referred to as a client connection device in this configuration), devices (not shown) connected to the PSTN 408, and/or devices (not shown) connected to the PSTN 416, and/or devices (not shown) connected to the client connection device 418/410. Since the client device 420 is connected to the IP LAN 420, presumably the telephone 420 is "intelligent" and knows or recognizes IP addresses and can generate destination IP addresses for devices it wishes to communicate with that are part of the system 400.

In some embodiments, the stand-by server 412 may be connected to the PSTN 416 via a gateway or client connection device 422 such that the stand-by server 412 can communicate with or via the PSTN 416 or some other PSTN without using the IP LAN 414. Similarly, in some embodiments, the main server 402 may be connected to the PSTN 408 or another PSTN via a gateway or client connection device 424 such that the stand-by server 408 can communicate with or via the PSTN 408 without using the IP LAN 404.

The system 400 and the system 200 previously discussed above are illustrative of the types of communications systems useable with the methods of FIGS. 2–7. However, other configurations or topologies of communications systems also are possible.

The methods of the present invention may be embodied as a computer program developed using an object oriented language that allows the modeling of complex systems with modular objects to create abstractions that are representative of real world, physical objects and their interrelationships. However, it would be understood by one of ordinary skill in the art that the invention as described herein could be implemented in many different ways using a wide range of programming techniques as well as general-purpose hardware systems or dedicated controllers. In addition, many, if not all, of the steps for the methods described above are optional or can be combined or performed in one or more alternative orders or sequences without departing from the scope of the present invention and the claims should not be construed as being limited to any particular order or sequence, unless specifically indicated.

Some or all of the methods described above can be performed on a single computer, computer system, microprocessor, etc. In addition, two or more of the steps in each of the methods described above could be performed on two or more different computers, computer systems, microprocessors, etc., some or all of which may be locally or remotely configured. The methods can be implemented in any sort or implementation of computer software, program, sets of instructions, code, ASIC, or specially designed chips, logic gates, or other hardware structured to directly effect or implement such software, programs, sets of instructions or code. The computer software, program, sets of instructions or code can be storable, writeable, or savable on any computer usable or readable media or other program storage device or media such as a floppy or other magnetic or optical disk, magnetic or optical tape, CD-ROM, DVD, punch cards, paper tape, hard disk drive, Zip™ disk, flash or optical memory card, microprocessor, solid state memory device, RAM, EPROM, or ROM.

Although the present invention has been described with respect to various embodiments thereof, those skilled in the art will note that various substitutions may be made to those embodiments described herein without departing from the spirit and scope of the present invention.

The words "comprise," "comprises," "comprising," "include," "including," and "includes" when used in this specification and in the following claims are intended to specify the presence of stated features, elements, integers, components, or steps, but they do not preclude the presence or addition of one or more other features, elements, integers, components, steps, or groups thereof.

The embodiments of the invention in which an exclusive property or privilege is claimed are defined as follows:

1. A method for allowing a stand-by server to operate as a replacement for a main server, comprising:

detecting, by a stand-by server, lack of a signal initiated by a main server, wherein reception of said signal is indicative of availability of said main server;

establishing a connection with at least one client connection device by said stand-by server to support a call, wherein said stand-by server operates as a replacement for said main server;

requesting current call state information from said client connection device;

receiving current call state information from said client connection device; and updating a call state information resource based on said current call state information received from said client connection device.

2. The method of claim 1, further comprising:
receiving configuration information.

3. The method of claim 1, wherein said establishing a connection with at least one client connection device includes establishing a connection with said client connection device using an IP address known to said client connection device.

4. The method of claim 1, wherein said requesting current call state information from said client connection device includes requesting information from said client connection device regarding status of at least one communication line supported by said client connection device.

5. The method of claim 1, wherein said receiving current call state information from said client connection device includes receiving information regarding status of at least one communication line supported by said client connection device.

6. The method of claim 1, further comprising:
prior to said detecting lack of a signal initiated by said main server, receiving at least one signal initiated by said main server, said at least one signal being indicative of availability of said main server.

7. The method of claim 1, further comprising:
requesting information regarding availability of said main server after said detecting lack of a signal initiated by said main server indicative of availability of said main server.

8. A method for allowing a stand-by server to take over support for communications from a main server, comprising:
detecting lack of a signal sent initiated by a main server, wherein reception of said signal is indicative of availability of said main server;
establishing a connection with at least one client connection device by said stand-by server to support a call, wherein said stand-by server operates as a replacement for said main server;
requesting that said client connection device reset an active call to a designated call state; and
creating a call state information resource based, at least in part, on said designated call state.

9. The method of claim 8, further comprising:
receiving configuration information.

10. The method of claim 8, further comprising:
prior to said detecting lack of a signal initiated by said main server, receiving at least one signal initiated by said main server, said at least one signal being indicative of availability of said main server.

11. The method of claim 8, further comprising:
requesting information regarding availability of said main server after said detecting lack of a signal initiated by said main server indicative of availability of said main server.

12. A method for allowing a stand-by server to take over support for communications from a main server, comprising:
a main server establishing at least one connection with at least one client connection device for support of at least one call;
said main server providing at least one signal to a stand-by server when said main server is available;
said stand-by server establishing at least one connection with said at least one client connection device to support said at least one call when said stand-by server does not receive a designated number of signals from said main server indicative of availability of said main server, wherein said stand-by server operates as a replacement for said main server;
said stand-by server requesting call state information from said at least one client connection device; and
said stand-by server updating a call state information resource based on said call state information received from said at least one client connection device.

13. A method for allowing a stand-by server to take over support for communications from a main server, comprising:
a main server establishing at least one connection with at least one client connection device for support of at least one call;
said main server providing at least one signal to a stand-by server when said main server is available;
said stand-by server establishing at least one connection with said at least one client connection device to support said at least one call when said stand-by server does not receive a designated number of signals from said main server indicative of availability of said main server, wherein said stand-by server operates as a replacement for said main server;
said stand-by server requesting said at least one client connection device to reset to a designated call state; and
said stand-by server creating a call state information resource based, at least in part, on said designated call state.

14. A computer program product in a computer readable medium for facilitating communications, comprising:
instructions for directing a first server to establish at least one connection with at least one client connection device for support of at least one call;
instructions for directing said first server to initiate at least one signal sent to a second server when said first server is available, said signal being indicative of availability of said first server to support said at least one call;
instructions for directing said second server to establish at least one connection with said at least one client connection device to support said at least one call when said second server does not receive a designated number of signals initiated by said first server indicative of availability of said first server, wherein said stand-by server operates as a replacement for said main server;
instructions for directing said second server to request call state information from said at least one client connection device; and
instructions for directing said second server to update a call state information resource based on said call state information received from said at least one client connection device.

15. A computer program product in a computer readable medium for facilitating communications, comprising:
instructions for directing a first server to establish at least one connection with at least one client connection device for support of at least one call;
instructions for directing said first server to initiate at least one signal sent to a second server when said first server is available, said signal being indicative of said first server being available to support said at least one call;
instructions for directing said second server to establish at least one connection with said at least one client connection device to support said at least one call when said second server does not receive a designated number of signals initiated by said first server indicative of availability of said first server, wherein said stand-by server operates as a replacement for said main server;
instructions for directing said second server to request said at least one client connection device to reset to a designated call state; and
instructions for directing said second server to create a call state information resource based, at least in part, on said designated call state.

* * * * *